United States Patent Office 3,433,083
Patented Mar. 18, 1969

3,433,083
MULTI-SHAFT TRANSMISSION COUPLINGS
Joseph A. Pope, Bramhall, and John E. H. Appleby, Cheadle Hulme, England, assignors to Mirrlees National Limited, a company under the Laws of the Queen of Great Britain, Northern Ireland and the Isle of Man
Filed Nov. 1, 1966, Ser. No. 591,295
Claims priority, application Great Britain, Nov. 2, 1965, 46,412/65
U.S. Cl. 74—68
Int. Cl. F16h 21/48
7 Claims

ABSTRACT OF THE DISCLOSURE

A multi-shaft transmission coupling intended to be used with at least three shafts wherein the axes of the shafts are parallel and in which there is a coupling crankshaft for each of the shafts, each crankshaft having at least two cranks of like throw, the cranks being arranged symmetrically about the axis of the crankshaft, the throws being the same and complementary for each crankshaft, the sets of corresponding cranks on the different crankshafts being coupled and common gyratory coupling members engaging each of said sets.

---

This invention relates to multi-shaft transmission couplings of the kind hereinafter termed the kind referred to, comprising a gyratory member having at least three journals in polygonal arrangement complementary to coupling cranks attached to the shafts to be coupled.

There are several known problems with such coupling mechanisms, including in particular the dynamic balancing of the gyratory mass of such coupling member, and the stresses which could be generated with couplings of the kind referred to due to unequal thermal expansions. Dynamic balance with such couplings has been obtained hitherto by counter-balance weights attached to the crankshafts.

However, there is another design factor, hitherto apparently unappreciated, which is that a coupling of the kind referred to, even when counter-balanced by weights, imposes stresses, not attributable to imbalance but arising from the inter-shaft transmission of explosion pressures and other forces, such stresses falling on the crankcase and other structural elements of the coupled assembly, and being in directions and of an order other than those which are normal in an engine and for which those structural elements are normally designed.

The present invention is based upon the appreciation of this factor, and lies in the conception of a simple solution, which can at the same time be made to solve the problem of dynamic balance.

According to the present invention a multi-shaft transmission arrangement for coupling at least three shafts, the axes of which are parallel, comprises a coupling crankshaft for each said shaft, each coupling crankshaft having at least two cranks of like throw, the cranks being arranged symmetrically with respect of the axis of the crankshaft, the throws being the same and complementary for each crankshaft and the sets of corresponding cranks on the different crankshaft being coupled by common gyratory coupling members.

Figure 1:
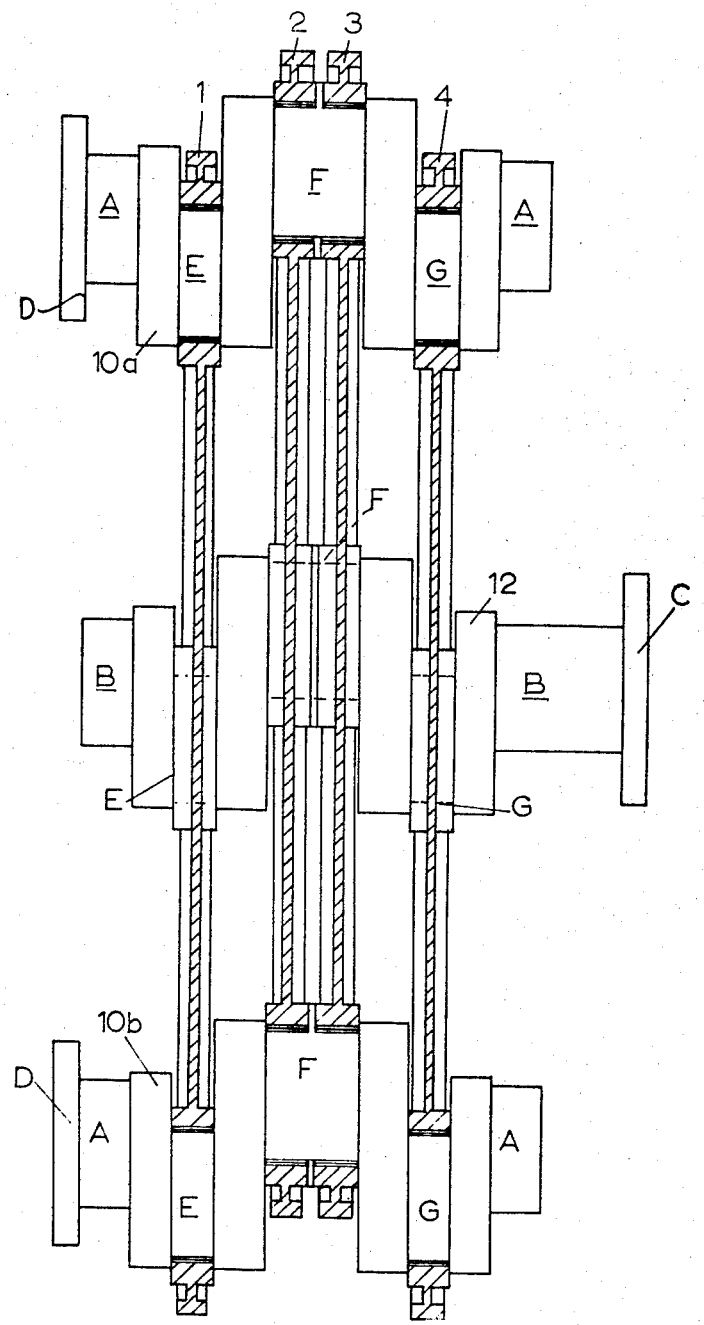
FIGS. 1 and 2 are side elevation and front elevation respectively of a preferred example of a transmission coupling of the kind referred to and constructed according to the present invention for the two pairs of crankshafts of a pair of opposed piston engines and having a common fifth output shaft.
Figure 2:
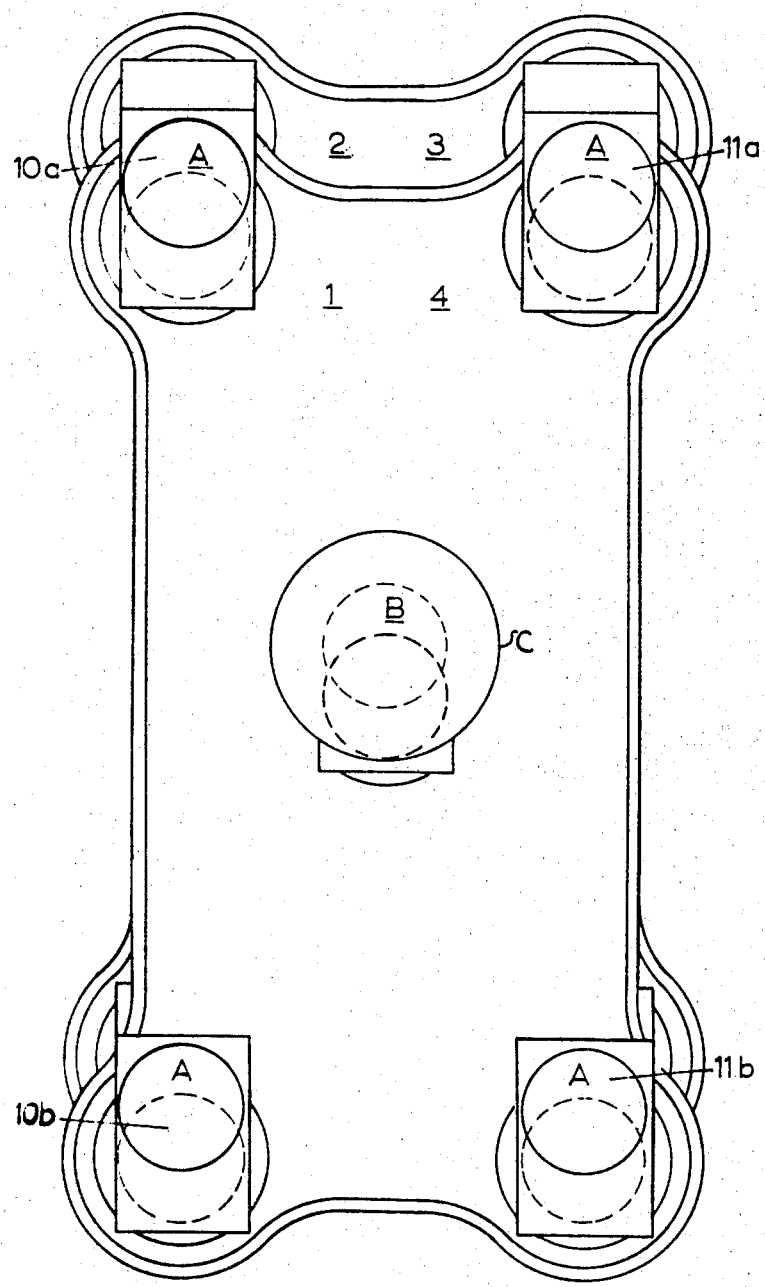

As shown in FIGS. 1 and 2 the coupling comprises two pairs of 3-throw coupling crankshafts 10a, 10b and 11a, 11b, one pair for each engine, their axes forming corners of a rectangle, and a central complementary 3-throw output crankshaft 12. Each of the coupling crankshafts of each pair has a coupling flange D by which such coupling crankshafts are adapted to be coupled one to the end of each of the engine crankshafts while the output crankshaft 12 has an output coupling flange C. Each of the coupling crankshafts 10a, 10b, 11a and 11b has end journals A at each end while the output crankshaft 12 has end journals B. All the three cranks E, F, and G of all five coupling crankshafts are of equal throw, with their cranks angularly spaced at 180 degrees, the centre cranks F being of twice the axial length of the outer cranks E and G so as to hold two gyratory coupling members 2 and 3 while the outer cranks E and G are at 180 degrees to the centre crank and therefore axially in line with each other. These outer cranks carry only a single gyratory coupling member 1 and 4 respectively. The gyratory coupling members are of I cross section with the webs imperforate, but may be perforate for lightening them. The cranks of the coupling crankshafts are symmetrically arranged to balance out force couples generated within the coupling assembly.

In operation, the flange D of each of the two pairs of coupling crankshafts receives torque from the two pairs of opposed crankshafts of the two engines, to which they are connected. This torque is transmitted by their cranks E, F and G and the four plate-like coupling members 1, 2, 3 and 4 to the cranks E, F and G of the central output crankshaft 12 which conveys the respective torques to the output flange C. Considering flange D of crankshaft 11a it can be seen that the applied torque is resisted by coupling members 1 and 4 on one side of the centre line of flange D and coupling members 2 and 3 on the opposite side of the centre line. This means that, apart from thermal stresses and the effects of strain in the crankshafts, there are no external forces transmitted to the journals. The dynamic forces are also completely contained within the structure of the coupling members 1, 2, 3 and 4; the input coupling crankshafts 10a, 10b, 11a, 11b and the output crankshaft 12, and being thereby contained within the coupling members and crankshafts and cause no stress to be applied to the journals A or B.

Any external forces mentioned above are exclusive of the torque and dynamic forces and are carried on journals A and B, the latter carrying the main part of the weight of the transmission coupling assembly.

In a modification (not shown) the central gyratory coupling members 2 and 3 could be replaced by a single coupling member of the same gyratory mass as these two, but the arrangement of FIGS. 1 and 2 has the advantage that all the gyratory coupling members are alike.

Figure 3:
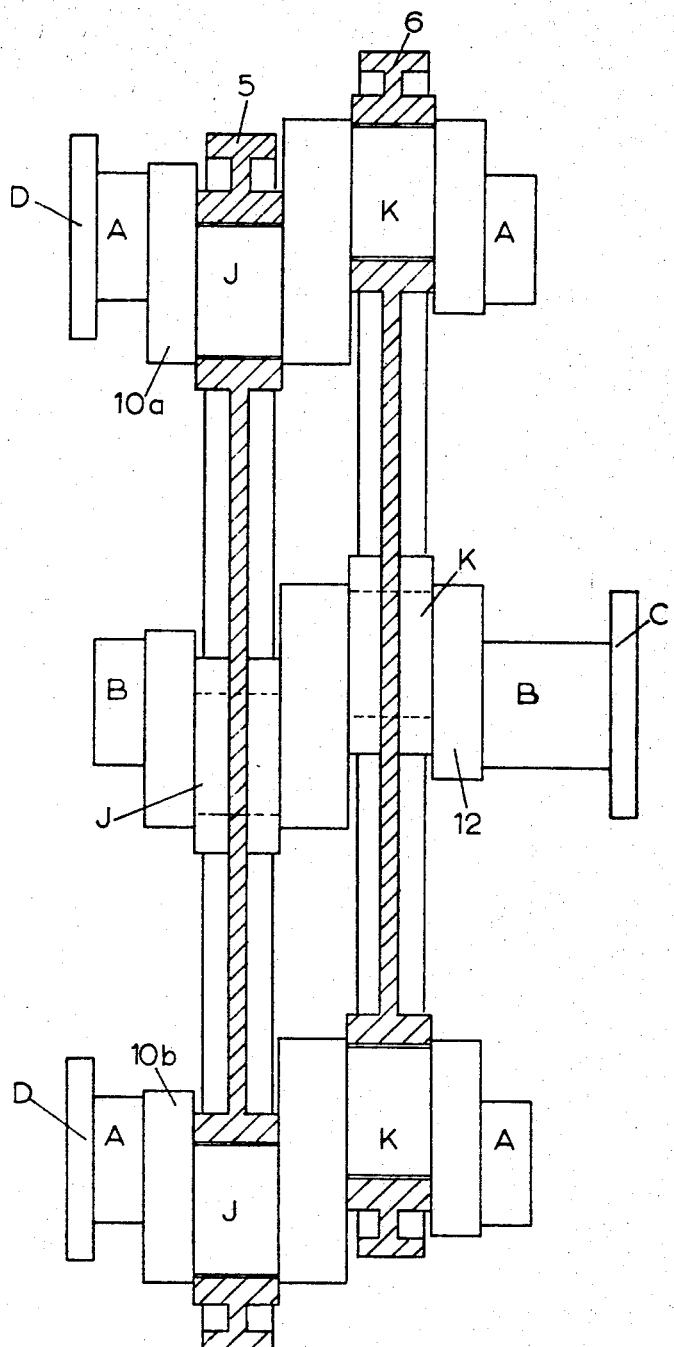
FIGS. 3 and 4 are views similar to FIGS. 1 and 2 of another example of a transmission coupling according to the present invention.
Figure 4:
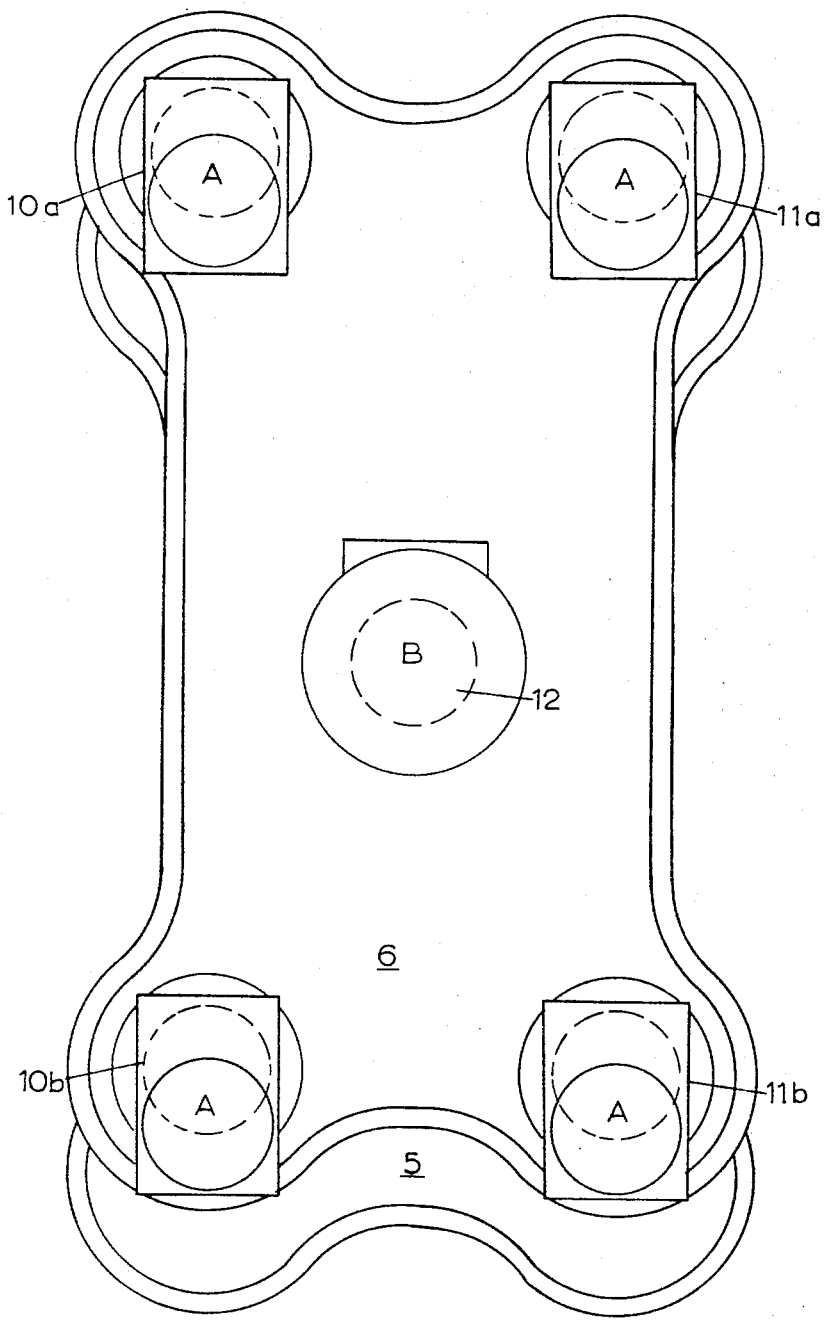

As shown in FIGS. 3 and 4 the coupling assembly includes the five coupling crankshafts, flanges etc., which are basically similar to those of FIGS. 1 and 2 and are given the same reference characters, but they are each only of 2-throw construction having crank pins J and K at 180 degrees to each other, carrying plate-like gyratory coupling members 5 and 6.

In operation, torque from the flanges D is transmitted through the cranks J and K and the plate-like gyratory coupling members 5 and 6 to the output cranks J and K but this arrangement produces an out-of-balance couple from the mass of the gyratory coupling members which has to be resisted by journals A and B and which will impose a vibration upon the frame of the engine. This outof-balance couple will necessitate the use of balance weights on the coupling crankshafts and is thus inferior to the arrangement shown in FIGS. 1 and 2 where transmission plates 1 and 4 balance dynamically the transmission plates 2 and 3, thus eliminating the need for balance weights. The torques themselves are however neutralised within the coupling system with the possibility of only small forces reaching the bearings A and B from the inherent force couple.

Bearing in mind that in the arrangement shown in FIGS. 3 and 4 the transmission plate-like coupling members 5 and 6, since two members are replacing four, have to be more robust than the transmission plates 1, 2, 3 and 4 in FIGS. 1 and 2 and allowing also for the weight of the balance weights in the former arrangement it would appear that weight-for-weight the two systems are approximately equal while that shown in FIGS. 1 and 2 is kinematically superior.

What is claimed is:

1. A multi-shaft transmission coupling arrangement for coupling at least three shafts, the axes of which are parallel, comprising a coupling crankshaft for each said shaft, each coupling crankshaft having at least two cranks of like throw, the cranks being arranged symmetrically with respect of the axis of the crankshaft, the throws being the same and complementary for each crankshaft and the sets of corresponding cranks on the different crankshafts being coupled, common gyratory coupling members engaging each of said sets.

2. A multi-shaft transmission coupling arrangement according to claim 1 further characterized in that the plurality of coupling cranks are constructed as parts of a multi-throw coupling crankshaft having its own bearings.

3. A multi-shaft transmission coupling arrangement according to claim 2 further characterized in that each coupling crankshaft is of two-throw construction and the common gyratory coupling members are two in number.

4. A multi-shaft transmission coupling arrangement according to claim 2 further characterized in that the multi-throw coupling crankshafts are of three-throw construction and the common gyratory coupling members are three in number.

5. A multi-shaft transmission coupling arrangement according to claim 4 wherein each crankshaft comprises a central crank at 180 degrees to two side cranks and central and side gyratory coupling members, the crank and coupling members all being arranged as an assembly to provide static balance conditions and to balance out force couples generated within the coupling assembly.

6. A multi-shaft transmission coupling arrangement according to claim 3 further characterized in that the gyratory coupling members constitute rectangles each having five journals, four of which are arranged with their axes at the corners of the rectangle.

7. A multi-shaft transmission coupling arrangement according to claim 4 further characterized in that the gyratory coupling members constitute rectangles each having five journals, four of which are arranged with their axes at the corners of the rectangle.

References Cited

UNITED STATES PATENTS

| | | | |
|---|---|---|---|
| 1,358,954 | 11/1920 | Holmstrom | 123—53 |
| 1,971,885 | 8/1934 | Viale | 74—68 |
| 2,093,495 | 9/1937 | Thompson | 74—68 |
| 3,359,957 | 12/1967 | Albrecht et al. | 123—53 |

FRED C. MATTERN, JR., *Primary Examiner.*

W. S. RATLIFF, JR., *Assistant Examiner.*

U.S. Cl. X.R.

123—53, 90, 192; 310—36, 191